Figure 1:
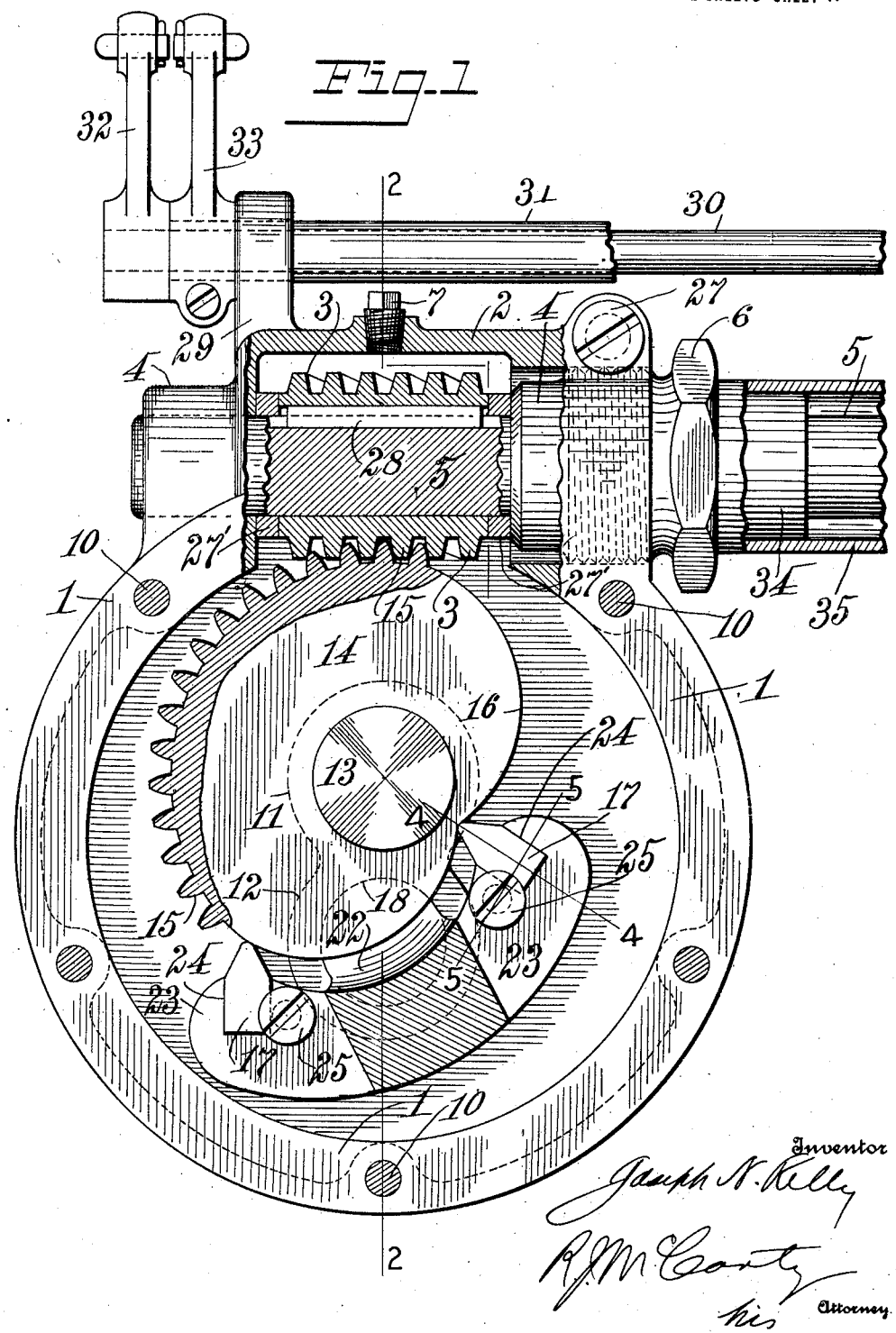

J. N. KELLY.
STEERING GEAR.
APPLICATION FILED MAR. 8, 1920.

1,378,680.

Patented May 17, 1921.
2 SHEETS—SHEET 1.

Inventor
Joseph N. Kelly his Attorney

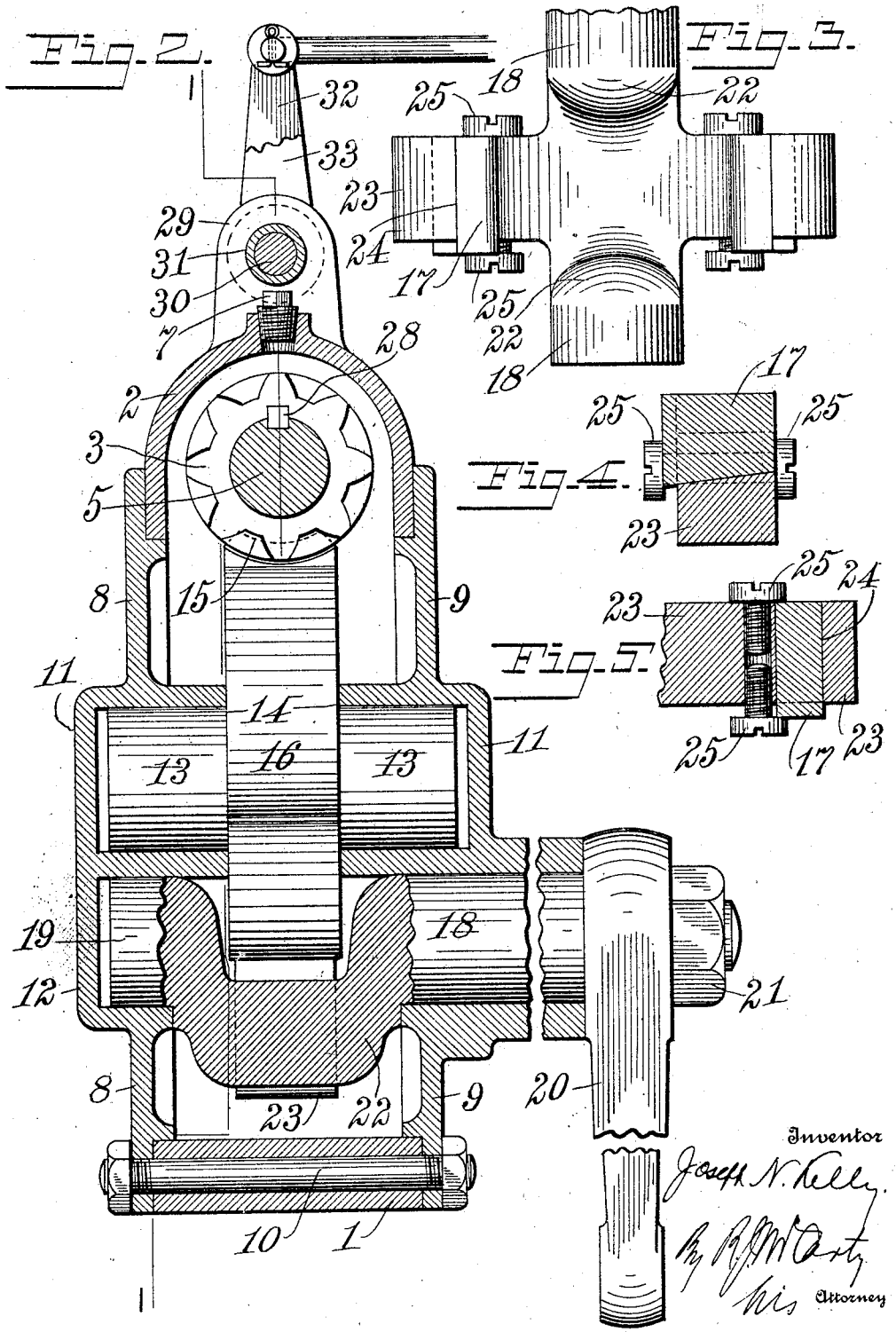

UNITED STATES PATENT OFFICE.

JOSEPH N. KELLY, OF DAYTON, OHIO.

STEERING-GEAR.

1,378,680.   Specification of Letters Patent.   Patented May 17, 1921.

Application filed March 8, 1920. Serial No. 364,178.

*To all whom it may concern:*

Be it known that I, JOSEPH N. KELLY, a citizen of the United States, residing at Dayton, in the county of Montgomery and State of Ohio, have invented certain new and useful Improvements in Steering-Gears, of which the following is a specification.

This invention relates to new and useful improvements in steering gears for automobiles.

The object of the invention is to provide a steering gear in which is combined economy of manufacture and efficiency in use to a desirable degree as will hereinafter more fully appear from the description to follow in connection with the accompanying drawings.

Referring to the accompanying drawings in general terms, Figure 1 is a side elevation approximately on the line 1—1 of Fig. 2 of my improved steering gear, one of the side plates being removed and parts being shown in section to facilitate illustration. Fig. 2 is a sectional view approximately on the line —2—2— of Fig. 1. Fig. 3 is a bottom plan view of the rocker and friction shoes. Fig. 4 is a detail section on the line —4—4— of Fig. 1 showing means whereby wear of the friction shoes may be taken up and Fig. 5 is a section of the same on the line —5—5— of Fig. 1.

In these drawings I have illustrated one embodiment of my invention and have shown the same as comprising a cam mounted independently of and operatively connected with the steering shaft so that it can be rotated in either direction by said shaft, Mounted adjacent to the cam and on an axis parallel with the axis of the cam is a rocker having on opposite sides of its axis parts arranged to engage the surface of said cam, the shape of said cam being such that the ends of the rocker will be moved in opposite directions by the movement of the cam. The rocker is operatively connected with the wheels to be steered. It will be understood, however, that the particular construction here shown has been chosen for the purpose of illustration only, as the invention may be embodied in various forms without departing from the spirit of the invention.

In the particular form of the device here shown the casing inclosing the gearing comprises an annular part —1— extended to provide a housing —2— which incloses the worm —3— and provides bearings —4— for the end of the steering shaft —5— and the adjusting nut —6—, to be again referred to. A screw plug —7— closes an opening in the worm housing —2— through which a lubricant may be applied. Annular plates —8— and —9— are fitted to the annular part —1—, and the three parts are united by bolts —10— and constitute the main housing of the gear. The said plates are constructed to provide bearings —11— and —12—, the former for the trunnions —13— of an oscillatory cam 14 adapted to be actuated from the steering shaft 5 and which in the present instance has secured thereto a gear which meshes with the worm 3. As here shown, the cam and gear are formed integral, the one part being provided with teeth —15— which mesh with the worm —3—, and the other part being in the form of a heart cam —16—, which engages friction shoes —17—, to be again referred to. The said combined gear and cam —14— is preferably, but not necessarily rigidly united to the trunnions —13—. A rocker shaft —18— is supported in the bearings —12— of the side plates of casing. The said rocker shaft is offset as at —22— at the point opposite the gear and cam member —14—, and one end of said shaft lying within the casing terminates in a trunnion —19— while the other portion of said shaft is extended beyond the casing to receive the steering crank —20— which is secured to the end thereof by means of a nut —21—. The manner of the connection of the steering crank —20— to a front wheel of the vehicle is well understood, therefore requires no illustration. The bent or offset part —22— has fixed to it the rocker —23— upon which the friction shoes —17— are mounted. It will be seen that the motion imparted to the gear and cam member —14— is transmitted to the rocker shaft —18— through the friction shoes —17— which ride over the cam surface of said member —14— the effective surface in the present case being that between the lowest point of the cam and the end tooth —15— on either side.

The said friction shoes are preferably tapered to a round form that engages or rides on the cam surface and they are so mounted in the rocker —23— that they may be adjusted in their position to take care of wear. For this purpose the ends of the rocker —23— are provided with slots —24— in which said shoes are set and fastened by screws —25—. The bottom of the slots —24— are tapered from one side to the other as shown in Fig. 4 and the bottom of each of the shoes —17— are correspondingly tapered. As is also shown in Figs. 3 and 4, the length of said shoes is greater than the width of the ends of the rocker —23—, therefore said shoes may be moved upon the inclined surfaces of the slots —24— to maintain contact with the cam surface of member —14— despite the wear. The said shoes —17— are fixed to the ends of the rocker —23— by means of the screws —25— which penetrate openings in said rocker on both sides and the heads of which engage the ends of the shoes and hold said shoes firmly in position.

The nut —6— is held in a set position by a binding screw —27—. The nut —6— adjusts the worm between thrust bearings —27'— at the ends thereof on the steering shaft —5—, to which said worm is secured by a key —28—. The nut —6— is provided with a boss —34— which receives the lower end of the steering column —35—. The worm housing has an extension —29— which forms a bearing for the lower end of the motor control shaft —30—. The said shaft, as well as the inclosing tube —31— thereof, and the arms —32— and —33—, are well known parts and inasmuch as they do not constitute any part of the present improvements, brief reference need be made thereto.

While I have shown and described one embodiment of my invention I wish it to be understood that I do not desire to be limited to the details thereof as various modifications may occur to a person skilled in the art.

Having described my invention, I claim:

1. In a steering mechanism, a steering post, a cam mounted independently of said steering post and rotatable in a fixed plane, a connection between said cam and said steering post to enable said cam to be moved in either direction by said steering post, a rocker mounted independently of said cam and having parts arranged in said fixed plane to engage the periphery of said cam at points on opposite sides of its axis, whereby the movement of said cam in said fixed plane will actuate said rocker, and a steering arm connected with said rocker.

2. In a steering mechanism, a steering post, a cam mounted independently of said steering post and rotatable in a fixed plane, a connection between said cam and said steering post to enable said cam to be moved in either direction by said steering post, a rocker arm extending transversely to the axis of said cam and having separated parts arranged near the respective ends thereof to engage the periphery of said cam at points on opposite sides of its axis, whereby the movement of said cam will actuate said rocker, and a steering arm connected with said rocker.

3. In a steering mechanism, a steering post, a cam mounted independently of said steering post, a connection between said cam and said steering post to enable said cam to be moved in either direction by said steering post, a rock shaft extending parallel to the axis of said cam, a rocker arm carried by said shaft and extending transversely thereto, said rocker arm having parts arranged on the opposite sides of its axis to engage the periphery of said cam at separated points, whereby the movement of said cam will actuate said rocker arm, and a steering arm connected with said rocker arm.

4. In a steering mechanism, a rotatably mounted toothed member, a worm to actuate said toothed member, a cam connected with said toothed member for rotation therewith, a rocker pivotally mounted independently of said toothed member and having a part arranged to be engaged by said cam whereby said cam will actuate said rocker, and a steering arm connected with said rocker.

5. In a steering mechanism, a rotatably mounted toothed member, a worm to actuate said toothed member, a cam connected with said toothed member for rotation therewith, a rocker pivotally mounted independently of said toothed member and having parts arranged on opposite sides of its axis to engage said cam, whereby said cam will impart movement to said rocker in both directions, and a steering arm connected with said rocker.

6. In a steering mechanism, a rotatably mounted toothed member, a worm to actuate said toothed member, a cam connected with said toothed member for rotation therewith, a shaft mounted independently of said cam, a rocker carried by said shaft and arranged off center with relation to the axis thereof, said rocker having parts arranged to be engaged by said cam, and a steering arm connected with said rocker.

7. In a steering gear, the combination of reduction gearing, a heart shaped cam movable therewith, a rocker shaft, a rocker mounted on said shaft and in operative relation with said cam, and means for adjusting the relation between said cam and rocker.

8. In a steering gear, the combination of reduction gearing, a double cam united to an element of said reduction gear and movable therewith, a rocker shaft, a rocker mounted on said shaft and in operative relation with said cam, and means for adjusting the relation between the cam and rocker.

9. In a steering gear, the combination of a worm, a motion-transmitting member driven from said worm, a rocker shaft, a rocker fixed to said shaft, and adjustable friction members carried by said rocker and engaged by a portion of the motion-transmitting member not engaged by the worm.

10. In a steering gear, the combination of a worm, a combined gear and cam driver from said worm, a rocker shaft, a rocker fixed to said shaft, and friction shoes mounted in the ends of said rocker and engaged by the said combined gear and cam.

11. In a steering gear, the combination of a worm, a gear driven from said worm having a cam portion, a rocker shaft, a rocker fixed to said shaft, and adjustable friction shoes mounted in said rocker and engaging the cam on said gear.

12. In a steering gear, the combination of a worm, a member having teeth on a portion of its circumference engaging said worm, and another portion of its circumference being in the form of a heart cam, a shaft, a rocker fixed to said shaft, and adjustable shoes carried by said rocker and engaged by said cam, whereby said shaft is actuated from the worm.

In testimony whereof I affix my signature.

JOSEPH N. KELLY.